United States Patent [19]

Feske

[11] Patent Number: 5,135,961
[45] Date of Patent: Aug. 4, 1992

[54] STABILIZED FLAME RETARDANT POLYOL COMPOSITION

[75] Inventor: Elbert F. Feske, Denham Springs, La.

[73] Assignee: Ethyl Corporation, Richmond, Va.

[21] Appl. No.: 560,083

[22] Filed: Jul. 27, 1990

[51] Int. Cl.$^5$ .............................................. C08G 18/32
[52] U.S. Cl. .................................. 521/117; 521/118; 521/132; 521/172; 521/175; 521/906; 252/182.27; 252/182.28; 252/609
[58] Field of Search .................. 252/182.27, 182.28, 252/609; 521/117, 118, 132, 172, 175, 906

[56] References Cited

U.S. PATENT DOCUMENTS

| | | | |
|---|---|---|---|
| 3,208,939 | 9/1965 | Latos et al. | 252/34 |
| 3,314,902 | 4/1967 | Wismer et al. | 521/175 |
| 3,428,567 | 2/1969 | Newton | 252/182.27 |
| 3,459,671 | 8/1969 | Marklow et al. | 252/609 |
| 3,876,509 | 4/1975 | Davis et al. | 203/38 |
| 3,883,581 | 5/1975 | Davis et al. | 260/485 |
| 3,891,605 | 6/1975 | Larsen et al. | 260/75 |
| 3,932,541 | 1/1976 | Davis et al. | 260/633 |
| 3,980,579 | 9/1976 | Syrop et al. | 521/171 |
| 4,111,828 | 9/1978 | Wang | 252/182.27 |
| 4,154,966 | 5/1979 | Weil | 568/841 |
| 4,194,068 | 3/1980 | Miller et al. | 521/107 |
| 4,468,481 | 8/1984 | Barda et al. | 521/171 |
| 4,511,688 | 4/1985 | Termine et al. | 252/609 |
| 4,722,942 | 2/1988 | Nichols et al. | 252/182.27 |
| 4,837,259 | 6/1989 | Chucta | 524/258 |
| 4,908,161 | 3/1990 | Ashida | 252/609 |

FOREIGN PATENT DOCUMENTS 1398529 6/1975 United Kingdom .

Primary Examiner—Maurice J. Welsh
Assistant Examiner—Rachel Johnson
Attorney, Agent, or Firm—David E. LaRose

[57] ABSTRACT

Polyol compositions comprising a polyol and a halogenated flame retardant are stabilized for storage and handling by the addition of a stabilizing amount of an amine.

28 Claims, No Drawings

STABILIZED FLAME RETARDANT POLYOL COMPOSITION

BACKGROUND

This invention relates to a flame retardant, halogen-containing polyol composition which composition is stabilized for handling and storage by the incorporation therein of a stabilizing amount of an amine.

Polyol compositions of this invention are generally used as precursors for the preparation of polyesters, polyurethanes, and elastomers. Of the polyol compositions, low viscosity, reactive flame retardant polyol compositions are well known for use in preparing polyurethane foams. Polyurethane foam precursor compositions usually comprise a sucrose and/or a polyester polyol, and a halogenated flame retardant. For examples of such polyol compositions see U.S. Pat. No. 4,511,688.

The physical and chemical properties of the polyurethanes prepared from polyol compositions of this invention are influenced by a number of factors including the cross-link density of the polyhydroxy compound used as a precursor. Linear or only slightly branched polymers are used to provide flexible foams whereas more highly branched polymers produce rigid foams.

For the preparation of rigid polyurethane foams, sucrose polyols are preferred since they provide a relatively high hydroxyl functionality which increases the cross-link density of the polyurethane foam. Sucrose polyols also tend to char during burning, enabling a greater flame retardant efficiency of the polyol composition.

Decomposition of the sucrose polyol during handling and storage of the polyol composition which is used in producing polyurethane foams is a problem. As the polyol composition decomposes, the viscosity drops and the composition darkens. This makes the blend less suitable for polyurethane applications. There is a need, therefore, for a stabilized polyol composition.

THE INVENTION

This invention relates to a stabilized polyol composition which composition comprises a polyol, a halogenated flame retardant and a stabilizing amount of an amine. In another embodiment, this invention provides to a flame retardant polyol composition comprising a halogenated hydroxy containing compound, a starch-based polyol or polyester and a stabilizing amount of an amine.

It has been discovered that the flame retardant polyol compositions of this invention exhibit excellent color and mechanical stability when stabilized with an amine. Compositions of this invention were found to be stable for substantial periods of time at elevated temperatures.

In another embodiment of the invention there is provided a flame retardant polyol composition for use in the preparation of rigid polyurethane foams, which composition comprises: a stabilizing amount of tertiary amine of the formula

wherein each R is independently a $C_2$ to $C_{20}$ aliphatic hydrocarbon group, or a $C_2$ to $C_{20}$ alcohol or mixtures thereof.

The halogenated hydroxyl containing derivatives of pentaerythritol suitable for use in the present invention include 2,2-bis(bromomethyl)1,3-dihydroxy-propane, commonly known as dibromoneopentyl glycol ("DBNPG"), 3-bromo-2,2-bis(bromomethyl) propanol, commonly known as tribromoneopentyl alcohol ("TBNPA"), 2-bromomethyl-2-hydroxymethyl-1,3-propanediol or mixtures thereof. Mixtures of brominated derivatives of pentaerythritol are available from Ethyl Corporation and designated as Saytex® FR-1138.

When preparing the flame retardant polyol composition of this invention, from about 50 to about 90 weight percent of a starch-based polyol is admixed with from about 10 to about 50 weight percent of the halogenated, hydroxyl-containing derivative of pentaerythritol. The starch-based polyol is preferably a sucrose polyol. For the purposes of this invention, the term "sucrose polyol" means at least one polyether polyol initiated on sucrose or a mixture of active hydrogen containing compounds comprising sucrose.

The sucrose polyol is formed by reacting an alkylene oxide or a mixture of alkylene oxides with an active-hydrogen-containing initiator compound. Typical active-hydrogen-containing initiator compounds include polyhydroxy compounds, such as sucrose, glycerin, diethylglycol and amines or mixtures of two or more of the foregoing. One such sucrose polyol is produced and sold by the Dow Chemical Company as Voranol® 446 polyol.

The tertiary amine which may be used as a stabilizer may be any tertiary amine which is compatible with the polyol composition to be stabilized and has a molecular weight of up to about 3000. Useful tertiary amines of this invention include $C_{8-20}$ alkyldimethamines, $C_{8-10}$ dialkylmethamines, tri-n-butylamine; tri-sec-butylamine; N,N-dibutylpentylamine; N-n-butyl-N-n-octyl-sec-butylamine; tripentylamine; trihexylamine, triethanol amine, tripropanolamine, tributanolamine, trisopropanolamine, 2-dimethylamino-2-methyl-1-propanol, 1,1',1"-nitrilotris-2-propanol, 1,1',1"-nitrilotris-2-butanol, 2-dimethylaminoethanol, 2-diethylaminoethanol, 2-dibutylaminoethanol, 2-diisopropylaminoethanol, 2,2'-(methylimino)diethanol, 2,2'-(ethylimino)-diethanol, 1-dimethylamino-2-propanol and the like. Of the tertiary amines, the more preferred are the trialkanolamines which are in the molten form from about room temperature up to about 100° C. Of the trialkanolamines the most preferred are the trialkanolamines of the lower alkanols such as triethanol amine, tripropanolamine, tributanol amine and the like.

While tertiary amines are the most preferred, primary, secondary, and quaternary amines may provide useful stabilizing qualities in flame retardant polyol compositions of this invention.

Preferably a stabilizing amount of the amine compound is used with the polyol composition such that the composition remains viscous and does not darken when stored or handled at temperatures as high as about 90° C. Thus, the polyol composition may contain from about 0.01 to about 3 weight percent of the amine. Preferably the polyol composition contains from about 0.05 to about 2 weight percent and most preferably from about 0.1 to about 1 weight percent of the amine.

When preparing the flame retardant polyol composition the sequence for addition of the amine compound is not important. The amine may be added to a blend of the dibromoneopentyl glycol and the starch-based polyol, or the dibromoneopentyl glycol and starch-based polyol may be added to the amine. Preferably, when adding the amine to the blend, the amine should be added to the blend before the blend is heated.

Once the composition contains a stabilizing amount of the amine, the composition can be blended and stored for a period of time at elevated temperatures without significant loss of viscosity or deterioration in color of the blend.

The following examples are given to illustrate the invention.

EXAMPLE I

A mixture of brominated derivatives of pentaerythritol designated as Saytex® FR1138 (Ethyl Corporation) (40 grams) was added to 60 grams of Voranol® 446 (Dow Chemical Co.). The blend was designated as Saytex® FR2024 (Ethyl Corporation). The blend was divided into separate portions. One portion had no stabilizer present and represented the base material. The other portions were each treated with a different stabilizer in the amounts indicated in the Table. The stabilizers used were: epoxidized soybean oil (Paraplex® G-62 from C. P. Hall); epoxy resin (DER 736 from Dow Chemical Company); propoxylated diethanol amine (SF 265 from Arco Chemical Company); and diethyltoluenediamine (Ethacure® 100 curative from Ethyl Corporation). All of the stabilized and unstabilized blends were aged at about 70° C. and the viscosity was measured in a constant temperature water bath of about 25° C. The viscosity of the blends was an indication of the stabilizing effect of each additive. A comparison of the stabilizing effect of the various stabilizers used is indicated in the Table.

TABLE

| Stabilizer | Amount (wt %) | Initial Viscosity (cp) | Days Aged | Viscosity (cp) | Days Aged | Viscosity (cp) |
| --- | --- | --- | --- | --- | --- | --- |
| None | 0 | 12,260 | 2 | 9,700 | 42 | 4,800 |
| " | 0 | 15,300 | 8 | 4,000 | — | — |
| " | 0 | 14,200 | 3 | 10,400 | 15 | 6,100 |
| " | 0 | 13,500 | 3 | 9,500 | 15 | 6,000 |
| " | 0 | 12,800 | 2 | 10,400 | 12 | 5,600 |
| " | 0 | 11,700 | 2 | 9,000 | 12 | 5,600 |
| SF-265 | 0.2 | 14,700 | 67 | 12,200 | 82 | 6,680 |
| SF-265 | 0.1 | 13,900 | 15 | 13,500 | 34 | 6,500 |
| SF-265 | 0.15 | 14,300 | 48 | 12,300 | 56 | 10,200 |
| SF-265 | 0.6 | 13,500 | 56 | 13,950 | 199 | 11,800 |
| SF-265 | 1.0 | 12,800 | 160 | 12,600 | 393 | 10,000 |
| DER 736 | 0.1 | 13,940 | 11 | 13,700 | 26 | 7,100 |
| DER 736 | 0.2 | 13,660 | 32 | 12,560 | 53 | 8,800 |
| DER 736 | 0.6 | 12,900 | 84 | 12,280 | 103 | 7,400 |
| Paraplex® G-62 | 0.1 | 14,360 | 5 | 15,000 | 11 | 9,400 |
| Paraplex® G-62 | 0.2 | 13,500 | 11 | 13,600 | 19 | 7,600 |
| Paraplex® G-62 | 0.6 | 13,260 | 33 | 13,300 | 39 | 7,600 |
| Ethacure® 100 | 0.1 | 14,300 | 20 | 13,850 | 78 | 9,500 |
| Ethacure® 100 | 0.3 | 14,250 | 20 | 13,900 | 78 | 11,000 |

Variations of the invention are within the spirit and scope of the appended claims.

What is claimed is:

1. A storage stabilized flame retardant polyol composition comprising:
   a) a polyol;
   b) a halogenated flame retardant; and
   c) a stabilizing amount of a stabilizer consisting essentially of a tertiary amine.

2. The composition of claim 1 wherein the polyol is a starch-based polyol, a polyester polyol or mixtures thereof.

3. The composition of claim 1 wherein the polyol is a sucrose polyol.

4. The composition of claim 1 wherein the tertiary amine is triethanol amine.

5. The composition of claim 1 wherein the stabilizing amount of tertiary amine is from about 0.1 to about 1 weight percent of the flame retardant polyol composition.

6. The composition of claim 1 wherein the amine is a tertiary amine has a molecular weight of up to about 3000.

7. The composition of claim 1 wherein the halogenated flame retardant is a halogenated hydroxyl containing derivative of pentaerythritol.

8. The composition of claim 1 wherein the halogenated flame retardant is dibromoneopentyl glycol.

9. A storage stabilized flame retardant polyol composition comprising:
   a) a starch-based polyol;
   b) a halogenated hydroxyl containing derivative of pentaerythritol; and
   c) a stabilizing amount of a stabilizer consisting essentially of a tertiary amine.

10. The composition of claim 9 wherein the starch-based polyol is a sucrose polyol.

11. The composition of claim 10 wherein the tertiary amine is triethanol or tripropanol amine.

12. The composition of claim 11 wherein the stabilizing amount of triethanol or tripropanol amine is from about 0.1 to about 1 weight percent of the flame retardant polyol composition.

13. The composition of claim 12 wherein the halogenated hydroxyl containing derivative of pentaerythritol is dibromoneopentyl glycol.

14. A rigid polyurethane foam formulation comprising the flame retardant composition of claim 9.

15. A storage stabilized flame retardant polyol composition for use in the preparation of rigid polyurethane foams which composition comprises a stabilizer consisting essentially of a stabilizing amount of a tertiary amine of the formula:

wherein each R is independently a $C_2$ to $C_{20}$ aliphatic hydrocarbon group, or a $C_2$ to $C_{20}$ alcohol or mixtures thereof.

16. The composition of claim 15 wherein the tertiary amine is triethanol or tripropanol amine.

17. The composition of claim 15 wherein the stabilizing amount of amine is from about 0.1 to about 1 weight percent of the flame retardant polyol composition.

18. The composition of claim 15 wherein the tertiary amine is triethanol amine and the stabilizing amount of amine is from about 0.1 to about 1 weight percent of the flame retardant polyol composition.

19. A process for preparing a storage stabilized, flame retardant polyol composition, which process comprises forming a mixture of polyol, halogenated flame retardant, and a stabilizer consisting essentially of tertiary amine said stabilizer being present in an amount sufficient to form said storage stabilized flame retardant polyol composition.

20. The process of claim 19 wherein the polyol is a sucrose polyol.

21. The process of claim 20 wherein the amine is triethanol amine.

22. The process of claim 21 wherein the amount of amine is from about 0.1 to about 1 weight percent of the flame retardant polyol composition.

23. The process of claim 19 wherein the amine is a tertiary amine with a molecular weight of up to about 3000.

24. The process of claim 19 wherein the halogenated flame retardant is a halogenated hydroxyl containing derivative of pentaerythritol.

25. The process of claim 19 wherein the mixture is formed at an elevated temperature.

26. The process of claim 19 wherein the amine is triethanol amine, the halogenated flame retardant is a halogenated hydroxyl containing derivative of pentaerythritol, and the polyol is a sucrose polyol.

27. The process of claim 26 wherein the amount of amine is from about 0.1 to about 1 weight percent of the flame retardant polyol composition.

28. The process of claim 27 wherein the mixture is formed at an elevated temperature.

* * * * *

UNITED STATES PATENT AND TRADEMARK OFFICE
CERTIFICATE OF CORRECTION

PATENT NO. : 5,135,961
DATED : AUGUST 4, 1992
INVENTOR(S) : ELBERT F. FESKE, Denham Springs, LA It is certified that error appears in the above-identified patent and that said Letters Patent is hereby corrected as shown below:

Col. 4, Line 18, delete: "amine is a".

Col. 4, Line 51, after "formula", insert the following:

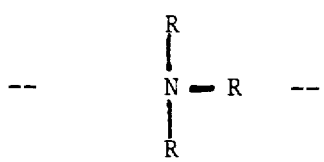

Signed and Sealed this

Thirty-first Day of August, 1993

Attest:

BRUCE LEHMAN

Attesting Officer
Commissioner of Patents and Trademarks